UNITED STATES PATENT OFFICE.

GUSTAV FÜTTERER, OF CHICAGO, ILLINOIS.

PRESERVING EGGS.

1,286,989.  Specification of Letters Patent.  Patented Dec. 10, 1918.

No Drawing.  Application filed November 24, 1917. Serial No. 203,679.

*To all whom it may concern:*

Be it known that I, GUSTAV FÜTTERER, a citizen of the United States, residing at Chicago, in the county of Cook and State of Illinois, have invented an Improvement in Preserving Eggs, of which the following is a specification.

This invention relates to preservative compounds, particularly to a preservative compound and a method of applying the same adapted to effect the preservation of eggs without impairing their marketability.

It has hitherto been proposed to employ preservative compounds for eggs, but so far as I am aware, all such compounds of the general character of the compound I employ, contain some active chemical antiseptic, such as, for instance, formaldehyde, to effect the killing of the bacteria upon the egg, and also of the bacteria which may reach the egg during the period of its attempted preservation.

These compounds of the prior art, to which I will refer as the medicated compounds (in which an active chemical antiseptic is employed) are not suitable for the preservation of eggs, for the reason that the active chemical antiseptic is characterized by a marked odor, which in itself stamps the egg as a medicated or treated egg, and impairs its marketability. Furthermore if the antiseptic be sufficiently powerful to perform its intended function, its odor is apt to penetrate the egg and affects its taste, either of these results seriously impairing the marketability of the egg.

In contra-distinction to these proposed methods of the prior art, I have found that a mixture of a dense fatty nature, preferably lard and beeswax, without any medication whatever, has the property of completely isolating bacteria so as to prevent their growth, and, with respect to the numerous bacteria upon which I have tried it, the further property of killing bacteria, or at least rendering them incapable of multiplying even when transferred from the mixture to cultures incubated under conditions most favorable to bacterial growth. Thus with a wide variety of bacteria, pathogenic and non-pathogenic, I have dipped active cultures into a mixture of lard and beeswax, removed them after a few minutes, and attempted to grow them under most favorable circumstances (on beef agar incubated to body heat and in moisture) but have in each case failed.

Both the isolation and the killing of the bacteria by non-medicated mixture of lard and beeswax is, in my opinion, effected by mechanical action, by a process of isolation and of suffocation, or its equivalent, and not at all by chemical action, such as that of an active chemical antiseptic.

In carrying out my invention for the preservation of eggs, I do not rely entirely upon the bacteria killing action of a non-medicated mixture of lard and beeswax, for the reason that bacteria may be present upon the egg shell, protected by coats of dirt or the like, or may even have penetrated into the egg shell. These bacteria might be free to penetrate into the egg because not effectively isolated by the lard and beeswax. I, therefore, while rejecting the active antiseptic method of killing these bacteria hitherto contemplated, kill them by heat and in a manner which does not affect either the appearance or the odor of the eggshell, or the taste or odor of the egg.

I form a mixture of approximately twenty parts of beeswax to eighty parts of lard, without medication or the addition of a chemical antiseptic. The proportions may vary somewhat, but there should be not less than 8% of beeswax in the mixture to obtain the best results, and the proportions given are preferred. I heat this mixture to a preferred temperature of 302° to 320° Fahrenheit. This temperature will instantly kill all bacteria, whether pathogenic or not. I then dip the eggs momentarily in this hot liquid mixture, with the result that all of the bacteria on the egg-shell, or in it, are instantly killed, whether or not protected by an incrustation of dirt, but the contents of the shell are not affected. Immediately removing the egg from the hot liquid mixture I wipe it, preferably with cheesecloth, to remove the excess of the hot liquid. The wiping should be done in a room having a temperature between 90° and 100° F. to prevent the too rapid congealing of the mixture. The coating remaining on the egg, therefore, congeals and forms a non-medicated protective coating which isolates all bacteria thereafter coming in contact with it, and prevents their growth into the egg, and also kills the bacteria settling upon it, I believe, by a species of mechanical action as distinguished from chemical antiseptic action.

This method leaves the egg absolutely unaffected in odor, appearance or taste, and if kept in a reasonably cool place the egg will be preserved for many months without the slightest impairment of its marketability or edible quality.

Eggs kept at so high a temperature are likely to undergo a liquefaction of the albumen and a softening of the yolk, even where there is no decay. I therefore prefer to apply my process to eggs and thereafter keep them in cold storage, or at least in a cold place. Eggs so treated can be used at the end of many months and are absolutely indistinguishable at the end of that time from new laid eggs. They have none of the familiar characteristics of cold storage eggs. However, my process will preserve eggs fresh in taste and odor for many months even when kept in warm places.

Having described my invention, I claim—

1. The process of preserving eggs and the like which consists in killing the bacteria in the egg shell and coating the egg shell with a non-medicated coating consisting of a dense fatty substance congealing at ordinary temperatures adapted to isolate bacteria.

2. The process of preserving eggs or the like which consists in killing the bacteria attached to the egg-shell, by heat, and coating the egg-shell with a non-medicated coating consisting of a dense fatty substance including an animal fat adapted to isolate bacteria.

3. The process of preserving eggs or the like which consists in momentarily dipping the eggs into a hot fatty substance, of a temperature sufficient to kill the bacteria on the egg shell, removing the excess substance, allowing the remainder thereof to congeal on the egg to form a coating adapted to isolate bacteria and prevent their growth.

4. The process of preserving eggs or the like which consists in dipping the eggs into a hot mixture of beeswax and lard, of a temperature sufficient to kill the bacteria on the egg shell, removing the excess substance, allowing the remainder thereof to congeal on the egg to form a coating adapted to isolate bacteria and prevent their growth.

5. The process of preserving eggs or the like which consists in dipping the eggs into a hot liquid mixture of not less than 5 parts of beeswax to not more than 95 parts of lard, at a temperature above 203° F., then removing the excess liquid and permitting the remainder to congeal to form a bacteria isolating protective coating on the eggs.

6. The process of preserving eggs or the like which consists in dipping the eggs into a hot liquid mixture substantially 20 parts of beeswax to 80 parts of lard, at a temperature between 302° and 320° F., removing the excess liquid in a room between 90° and 100° F., permitting the remainder to congeal on the eggs and form a bacteria resistant coating.

In testimony whereof, I have signed my name to this specification.

GUSTAV FÜTTERER.

Copies of this patent may be obtained for five cents each, by addressing the "Commissioner of Patents, Washington, D. C."